United States Patent [19]
Eckert et al.

[11] Patent Number: 5,521,803
[45] Date of Patent: May 28, 1996

[54] FLASHLIGHT WITH FLEXIBLE CORE

[76] Inventors: Lee H. Eckert, 375 Mountain Rd., Cheshire, Conn. 06410; Julian Watt, 11 Upper Grassy Hill Rd., Southbury, Conn. 06488; Robert Kubicko, 6 Biltmore Rd., Shelton, Conn. 06484; Richard J. Carbone, 225 Perkins Rd., Southbury, Conn. 06488

[21] Appl. No.: 286,313

[22] Filed: Aug. 5, 1994

[51] Int. Cl.⁶ .................................................... F21L 7/00
[52] U.S. Cl. .......................... 362/198; 362/199; 362/226; 362/285; 362/419; 362/421; 248/160; 248/276.1
[58] Field of Search ............................ 362/20, 194, 195, 362/196, 197, 198, 199, 226, 285, 421, 418, 419, 427; 248/160, 276

[56] References Cited

U.S. PATENT DOCUMENTS

| | | | |
|---|---|---|---|
| D. 147,258 | 8/1947 | Becker | D26/43 |
| D. 152,584 | 2/1949 | Becker | D26/43 |
| D. 166,073 | 3/1952 | Dunkelberger | D26/43 |
| D. 190,295 | 5/1961 | Becker et al. | D26/43 |
| D. 192,935 | 5/1962 | Becker et al. | D26/43 |
| D. 240,322 | 6/1976 | Staub | D26/43 |
| D. 268,442 | 3/1983 | Darmon | D26/24 |
| D. 281,820 | 12/1985 | Oba et al. | D26/43 |
| D. 283,645 | 4/1986 | Tanaka et al. | D26/43 |
| D. 302,325 | 7/1989 | Charet et al. | D26/60 |
| D. 304,089 | 10/1989 | Wan | D26/42 |
| D. 306,351 | 2/1990 | Charet et al. | D26/43 |
| D. 314,246 | 1/1991 | Bache | D26/62 |
| D. 321,062 | 10/1991 | Bonbright | D26/140 |
| D. 322,681 | 12/1991 | Yuen | D26/38 |
| D. 328,146 | 7/1992 | Sinsteden | D26/49 |
| D. 329,504 | 9/1992 | Yuen | D26/42 |
| D. 337,839 | 7/1993 | Zeller | D26/43 |
| D. 338,542 | 8/1993 | Yuen | D26/42 |
| D. 341,220 | 11/1993 | Eagan | D26/43 |
| D. 344,602 | 2/1994 | Yuen | D26/42 |
| 599,543 | 2/1898 | Whitaker | 248/160 |
| 642,648 | 2/1900 | Van Duzer | 362/1.98 |
| 1,108,350 | 8/1914 | Farber | 362/198 |
| 1,232,824 | 7/1917 | Mayhew | 362/202 |
| 1,279,803 | 9/1918 | Watson | 248/160 |
| 1,596,152 | 8/1926 | Carter | 338/214 |
| 1,692,394 | 11/1928 | Sundh | 362/198 |
| 2,427,890 | 9/1945 | White | 34/647 |
| 2,467,954 | 4/1949 | Becker | 362/198 |
| 2,533,494 | 12/1950 | Mitchell, Jr. | 248/160 |
| 2,581,129 | 1/1952 | Muldoon | 362/184 |
| 2,648,762 | 8/1953 | Dunkelberger | 362/198 |
| 2,705,279 | 3/1955 | Berlinger | 362/197 |
| 3,103,723 | 9/1963 | Becker | 24/3.12 |
| 3,111,277 | 11/1963 | Grimsley | 362/197 |
| 3,393,311 | 7/1968 | Dahl | 362/190 |
| 3,393,312 | 7/1968 | Dahl | 362/190 |
| 3,479,499 | 11/1969 | Dahl | 362/198 |
| 3,546,961 | 12/1970 | Marton | 74/502.5 |
| 3,584,822 | 6/1971 | Oram | 362/421 |
| 3,731,084 | 5/1973 | Trevorrow | 362/108 |
| 3,852,587 | 12/1974 | Koehler | 362/197 |
| 3,961,175 | 6/1976 | Otagoshi | 362/199 |
| 3,962,678 | 6/1976 | Kurokawa | 362/275 |
| 4,023,757 | 5/1977 | Allard et al. | 248/70 |

(List continued on next page.)

FOREIGN PATENT DOCUMENTS

| | | | |
|---|---|---|---|
| 0694327 | 4/1927 | Australia | 362/198 |
| 7929287 | 10/1979 | Germany . | |
| 117285 | 7/1918 | United Kingdom . | |
| 971866 | 10/1964 | United Kingdom . | |

*Primary Examiner*—Denise L. Gromada
*Assistant Examiner*—Alan B. Cariaso

[57] ABSTRACT

A flexible core for a hand-held device such as a flashlight includes a pair of conductive wires which electrically connect a source of power to a power using implement. A flexible spine surrounds the pair of conductive wires and includes a plurality of interconnected universally rotatable members. A resilient sleeve engages the outer surface of the rotatable members forming the spine. An adaptor including one conductor made from nickel chromium wire may be used to selectively connect the flashlight to a 12 volt source of electrical power in lieu of two standard C cells housed within the flashlight.

21 Claims, 9 Drawing Sheets

OTHER PUBLICATIONS

| | | | |
|---|---|---|---|
| 4,117,535 | 9/1978 | Holt | 362/382 |
| 4,241,371 | 12/1980 | Sage | 362/61 |
| 4,305,560 | 12/1981 | Ban | 248/160 |
| 4,410,835 | 10/1983 | Zabroski | 362/20 |
| 4,437,144 | 3/1984 | Guenther | 362/275 |
| 4,463,283 | 7/1984 | Penney et al. | 362/20 |
| 4,495,550 | 1/1985 | Visciano | 362/189 |
| 4,533,982 | 8/1985 | Kozar | 362/183 |
| 4,733,337 | 3/1988 | Bieberstein | 362/206 |
| 4,839,599 | 6/1989 | Fischer | 324/542 |
| 4,853,965 | 8/1989 | Blonski | 381/205 |
| 4,869,552 | 9/1989 | Tolleson et al. | 297/296 |
| 4,907,139 | 3/1990 | Schladitz et al. | 362/145 |
| 4,916,596 | 4/1990 | Sharrah et al. | 362/190 |
| 4,977,489 | 12/1990 | Fung | 362/184 |
| 4,998,190 | 3/1991 | Claessen | 362/306 |
| 5,033,528 | 7/1991 | Volcani | 160/351 |
| 5,063,933 | 11/1991 | Takahashi | 128/653.5 |
| 5,101,333 | 3/1992 | Glassford | 362/413 |
| 5,103,384 | 4/1992 | Drohan | 362/191 |
| 5,150,710 | 9/1992 | Hall et al. | 128/653.5 |
| 5,154,483 | 3/1992 | Zeller | 362/198 |
| 5,163,752 | 4/1992 | Copeland et al. | 362/396 |
| 5,209,562 | 5/1993 | Glassford | 362/378 |
| 5,217,297 | 6/1993 | Yuen | 362/184 |
| 5,268,826 | 10/1993 | Greene | 362/103 |
| 5,276,596 | 1/1994 | Krenzel | 362/191 |
| 5,369,556 | 11/1994 | Zeller | 362/198 |
| 5,383,633 | 1/1995 | Ellestad | 248/160 |
| 5,385,500 | 1/1995 | Schmidt | 446/73 |
| 5,398,176 | 3/1995 | Ahuja | 362/421 |

FLASHLIGHT WITH FLEXIBLE CORE

BACKGROUND OF THE INVENTION

This invention relates to a hand-held flashlight and in particular to a flexible core for connecting the power generating end of the flashlight to the power using end thereof.

The modern flashlight is one of the most useful implements found in the home, automobile, or other locations whereat it is desirable to have a portable source of illumination. Very often, the flashlight is employed in situations whereat it is desirable that the user's hands be free to hold or maneuver an object being illuminated.

For example, when a person is performing maintenance on an automobile, there are many instances when the use of both hands to perform a maintenance task is desirable even though artificial illumination is still needed. Other such applications include reviewing documents, as for example reading maps in a car, attempting to find an object in a relatively dark location, and performing similar tasks. When the user has a standard flashlight, the user must resort to various unorthodox means for holding the flashlight to free up his or her hands. For example, the user may place the flashlight under an arm, in a mouth, or rest the flashlight on a nearby support which may not necessarily be sufficiently close to the object being viewed to provide the desired illumination.

Heretofore there have been a variety of lighting products that have included flexible cores for the general purpose of manipulating a light source into a desired position. In some cases, the light source is in a base and a flexible core contains glass fibers to conduct the light to the tip of the core. Some of these lighting products are battery powered, while most are AC powered to provide the high intensity light generally needed for such applications as inspection work.

In other cases, the light may be constructed with a gooseneck formed from strip wound, interlocked, flexible metal tubing. Generally, such a lighting product is used for AC powered lamps such as desk lighting and includes two wires internally carried by the flexible metal tubing. In some battery powered applications, one of the wire conductors may be omitted and the second conductive path is provided by the flexible metal tubing itself.

There are several other lighting products, some of which are battery powered and others of which are AC powered, that utilize a flexible core constructed from a plastic jacket and coaxial cable. The center core is usually a solid wire. It is separated by a plastic insulator, around which is wrapped a braided metal wire sheathing. The plastic jacket, typically a polyvinyl chloride, shields the exterior. Other lights having a flexible core use a series of copper, lead, or aluminum solid wire, that are either individual or stranded together to provide physical support for the flexible core. In some instances, the wire or wires are used as conductors, to provide one or more of the two required electrical paths for a light source. In some applications, the wires are bare and in others the wires may be individually or collectively insulated with some plastic sleeving Further, there are several known AC powered lights that utilize a series of interlocking plastic elements to form a flexible core. This core is sold under brand names such as "LockWood" and "Cederburg." The flexible core was developed to carry cutting/cooling fluid to work pieces supported on metal cutting machines such as lathes and milling machines. The flexible core is generally hollow, and is leak tight. The core is flexible to allow the fluid to be directed onto various work pieces as needed. AC powered lights utilizing this flexible core generally have two insulated wires running inside the center hole formed by the flexible plastic elements.

The main problem with cores utilizing the common gooseneck strip wound, interlocked flexible metal tubing is that the bend radius is too limited for a flexible light application. Although the gooseneck tubing is reasonably durable, it also suffers from a gradual reduction in its ability to withstand a flexing force due to wear at the interlocking surfaces. The interlocking surfaces provide the requisite friction to make the product hold the shape into which the user has placed the core.

The main problem associated with the metal wire and/or coaxial cable types of cores is that they have a very limited flex life. The metal rapidly fatigues and, if bent back and forth continuously at the same location, the core will tend to break at that spot. In some instances, this can occur after only 100 bending cycles.

The core formed by a plurality of plastic interlocking elements offers the advantage of long life while bending back and forth. The core does not tend to fatigue, and due to the use of low friction coefficient materials, such as acetel plastic, the core elements tend to have relatively little wear. However, prior art plastic interlocking element cores tend to suffer from a few problems. Since each element is free to rotate relative to the next interlocked element, the whole chain of plastic elements can become skewed and kinked and thus fall out of alignment. This creates a very unattractive core. In addition, the elements are linked together by snapping each element together as a ball-joint socket to the next successive element. While the foregoing allows a relatively large amount of free movement and easy assembly/disassembly, such structure also allows the elements to separate from one another if the interlocked chain is bent into too tight a radius by a relatively strong applied force. Modifications to the socket design will increase the ability of the core to withstand forces that tend to cause socket separation.

One of the usual situations involving the need to have a "hands free" flashlight involves reading a map or similar document in an automobile. It is desirable to have a flashlight capable of being powered by a relatively few standard AA, C or D cells while also having the ability of being powered by the much higher level of DC voltage available from a standard automobile battery. For this application the relatively few cells is preferably two which will provide an average DC voltage of 2.4 volts. The higher DC voltage generated by the automobile battery must be converted to a lower working voltage level usable by a flashlight bulb, without excessive heat generation. Such voltage conversions may be accomplished with a DC convertor or pulse width modulation circuit or by the use of passive means, such as a dropping resistor.

The circuit approach has several basic drawbacks. The first is the relatively expensive cost associated with components and manufacture and the second is the problem of having to enclose the circuit board having the control within the flashlight. A third drawback is reliability due to the increased number of components and relatively harsh operating environment.

The dropping resistor on the other hand is inexpensive and reliable but creates excessive heat when dissipating the power produced in dropping the DC voltage from 12 volts to approximately 2.4 volts. This heat generation poses a packaging problem due to temperature limitations of the standard plastic materials employed in the manufacture of the flashlight housing.

Accordingly, it is an object of this invention to provide a flexible core for a flashlight or similar device which is capable of holding a user-defined shape, permits repetitive flexing and enables the power conducting means to pass through the core so that power supplied at one end of the core can be delivered to the other end which includes a power using element.

It is a further object of the invention to provide an adaptor for a flashlight or other similar device which will enable the device to be powered by standard dry cells or a 12 volt automotive battery.

SUMMARY OF THE INVENTION

The foregoing object and other objects of the invention are attained in a flexible core for a flashlight or similar device. The flashlight core connects a first housing having at least one battery supported therein to a second housing. The battery serves as a source of power and the second housing includes means connected to the source of power for using the power. The flexible core comprises a pair of conductive wires electrically connecting the battery to the power using means. A flexible spine surrounds the pair of conductor wires and includes a plurality of interconnecting universally rotatable members. A resilient sleeve member engages an outer surface of each rotatable member forming the spine.

In a preferred embodiment the device may be alternatively connected to a 12 volt source of DC voltage or to a standard dry cell battery such as a C cell. One of the conductors connecting the device to the 12 volt source of DC voltage is formed from nickel-chromium wire. The nickel-chromium wire functions as a dropping resistor to reduce the voltage level delivered from the 12 volt source of DC voltage to the level which may be used by the flashlight bulb or other power using element of the device.

DESCRIPTION OF THE PREFERRED EMBODIMENT

Referring now to the various figures of the drawing, there is disclosed a preferred embodiment of the present invention. In referring to the various figures of the drawing, like numerals shall refer to like parts.

Figure 1:
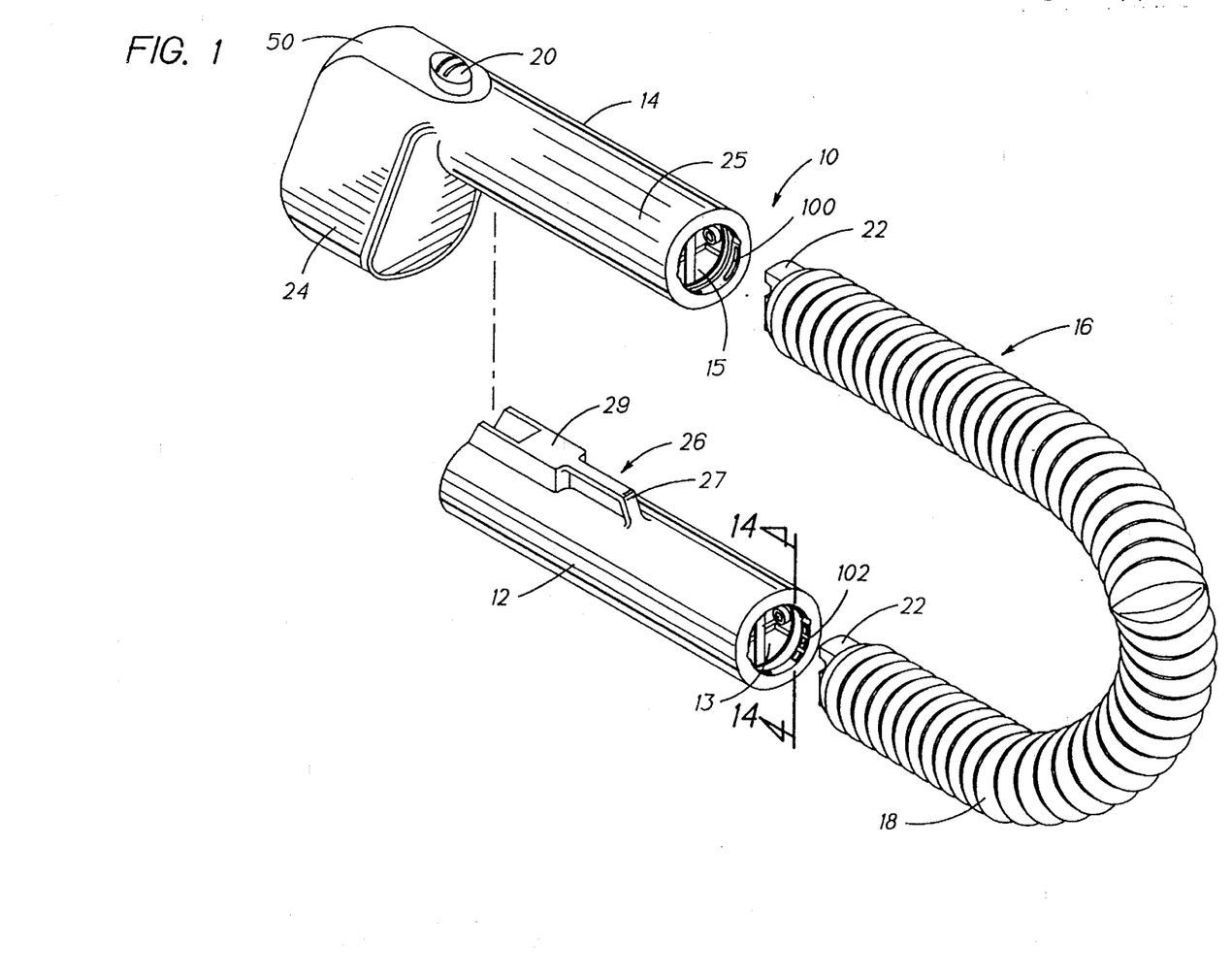
FIG. 1 is a perspective, exploded view illustrating features of the flashlight of the invention.

Referring specifically to FIG. 1, there is disclosed a flashlight 10 having a first housing 12 and a second housing 14. Housings 12 and 14 are spaced apart and are connected together through a flexible core 16. Housing 12 serves as the power end of the flashlight and contains therewithin batteries 78 and 80 (see FIG. 2) used as the primary source of electrical power for the flashlight. Batteries 78 and 80 may be standard C-cells.

Figure 2:
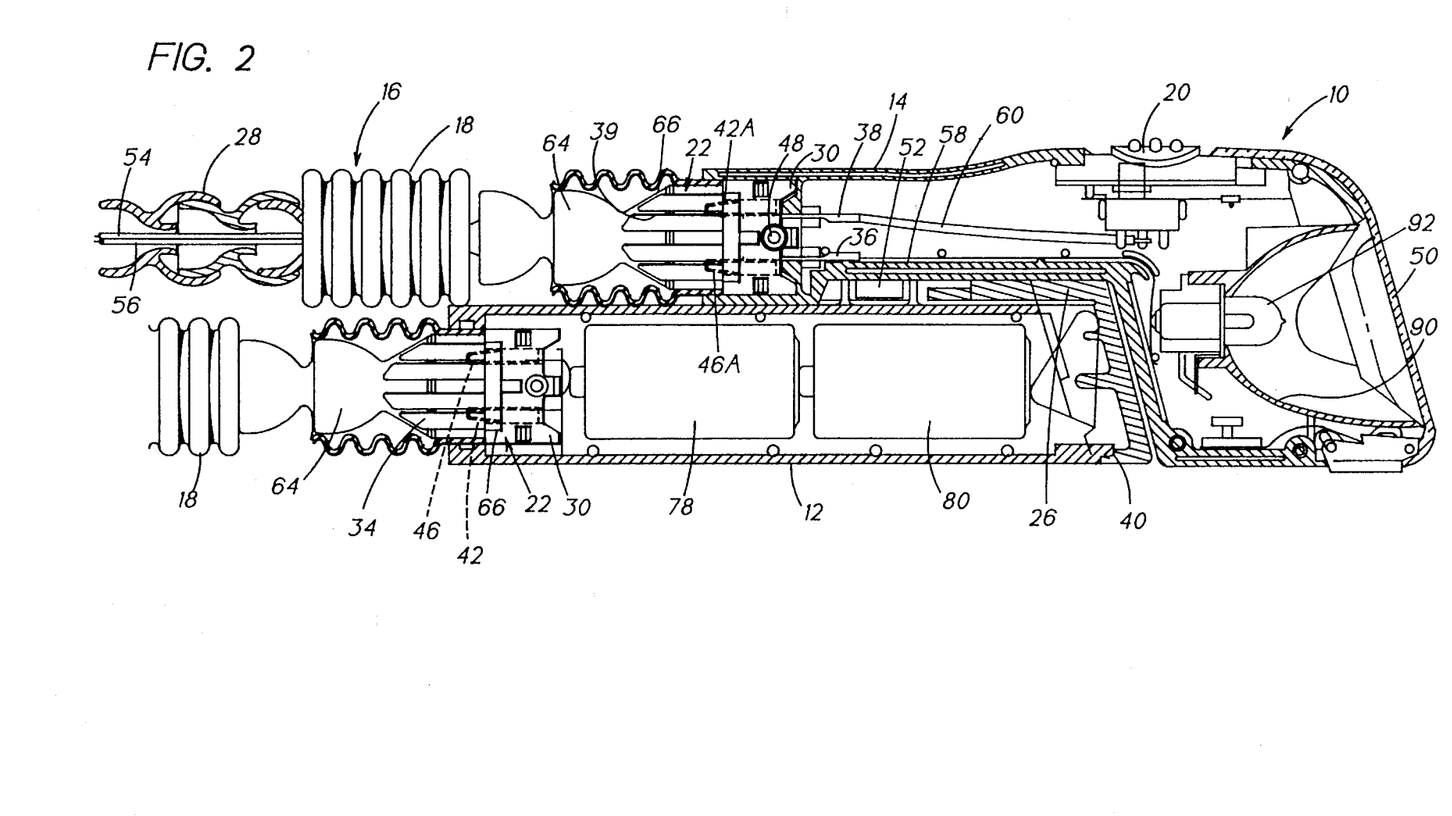
FIG. 2 is a side elevational view, partially in section, of the flashlight of FIG. 1.
Figure 3:
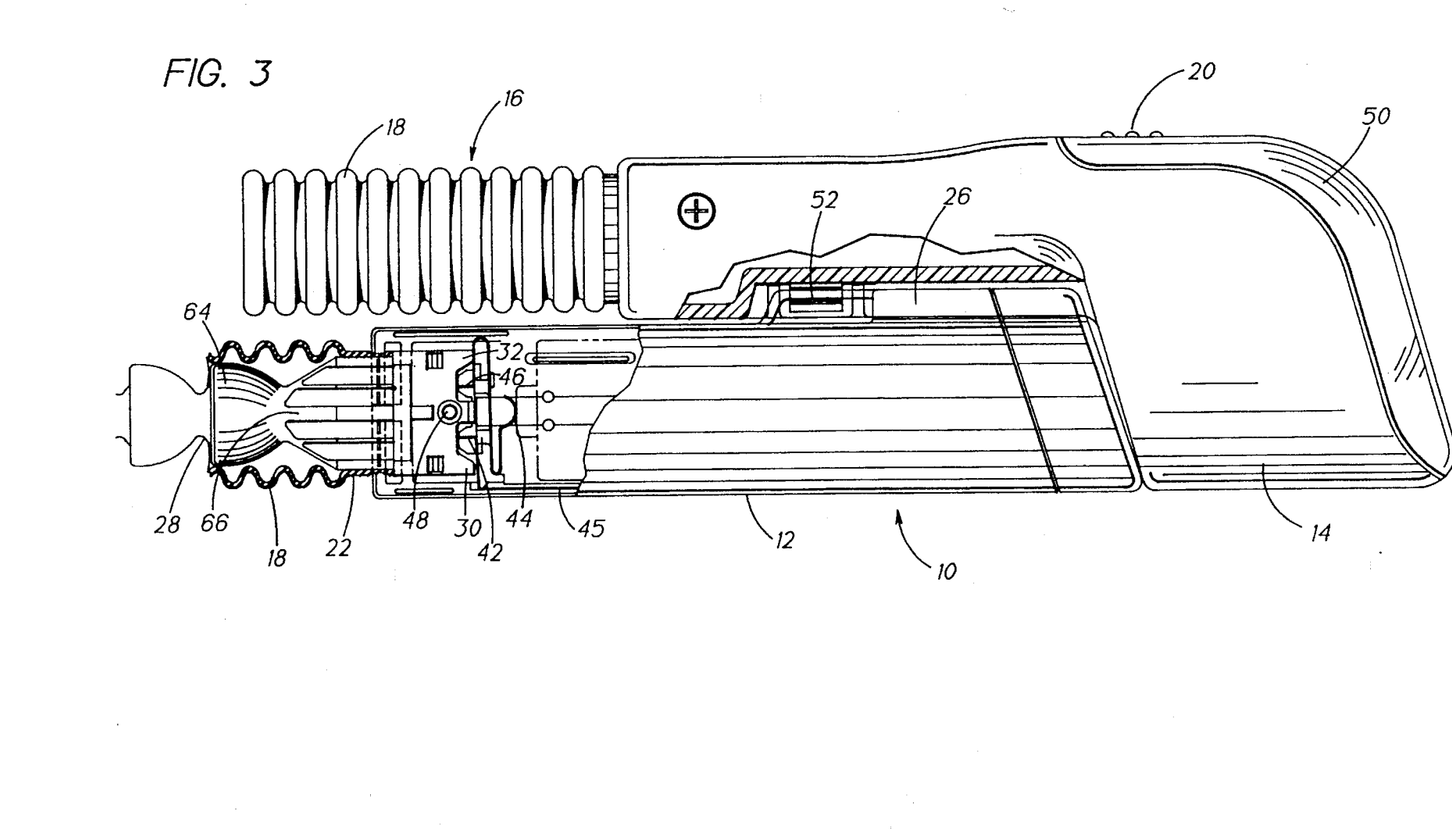
FIG. 3 is a side elevational view with portions broken away to illustrate further details of the flashlight.

Housing 14 functions as the working end of flashlight 10 and includes a lens 50. As shown in FIG. 2, housing 14 also has mounted therewithin reflector 90 and bulb 92. A switch 20 is provided to selectively connect bulb 92 to the source of electrical power such as batteries 78 and 80.

Housing 14 is generally L-shaped and includes a generally cylindrically-shaped elongated leg 25 and a somewhat rectangularly-shaped shorter leg 24 extending from leg 25. Leg 24 mounts lens 50, reflector 90, and bulb 92.

Housing 12 includes a bore 13 and leg 25 of housing 14 includes a similar bore 15. One end of flexible core 16 is inserted into bore 15 and the other end is inserted into bore 13. Each end of core 16 has an anchor 22 to be more fully described hereinafter which is inserted into one of the bores 13, 15 for joining flexible core 18 to housings 12 and 14.

Referring primarily to FIGS. 2–10, additional features of flashlight 10 shall now be described in detail. Flexible core 16 includes an outer resilient sleeve 18 made from a resilient elastomeric material such as a thermoplastic rubber sold by the Monsanto Corporation under the trademark "Santoprene." Referring particularly to FIG. 4 a flexible spine 28 is contained within sleeve 18. Spine 28 comprises a plurality of interconnected universally rotatable members. Each universally rotatable member comprises a male end portion 28A and a female end portion 28B. The male end portion 28A has an outer surface comprising a frustum of a sphere and the female end portion 28B has a mating inner surface comprising a frustum of a sphere which is dimensioned so that, when the male end portion 28A is inserted into the female end portion 28B, there is frictional contact between the mating outer and inner surfaces 28A and 28B. These frictional forces function as retaining means to hold one member of the flexible spine 28 at any desired location relative to an interconnected member. These frictional forces may be overcome which permits interconnected members to be moved relative to each other so that their longitudinal axes may either be in or out of alignment. The interconnected segments have relatively unrestricted rotational movement therebetween. The segments of the flexible spine 28 are produced by Lockwood Products, Inc. and are made from acetal plastic or other suitable material. Electrical conductors 54 and 56 are disposed within flexible spine 28. One end of conductors 54, 56 is connected to housing 12 and the other end of the conductors is connected to working end housing 14.

Figure 4:
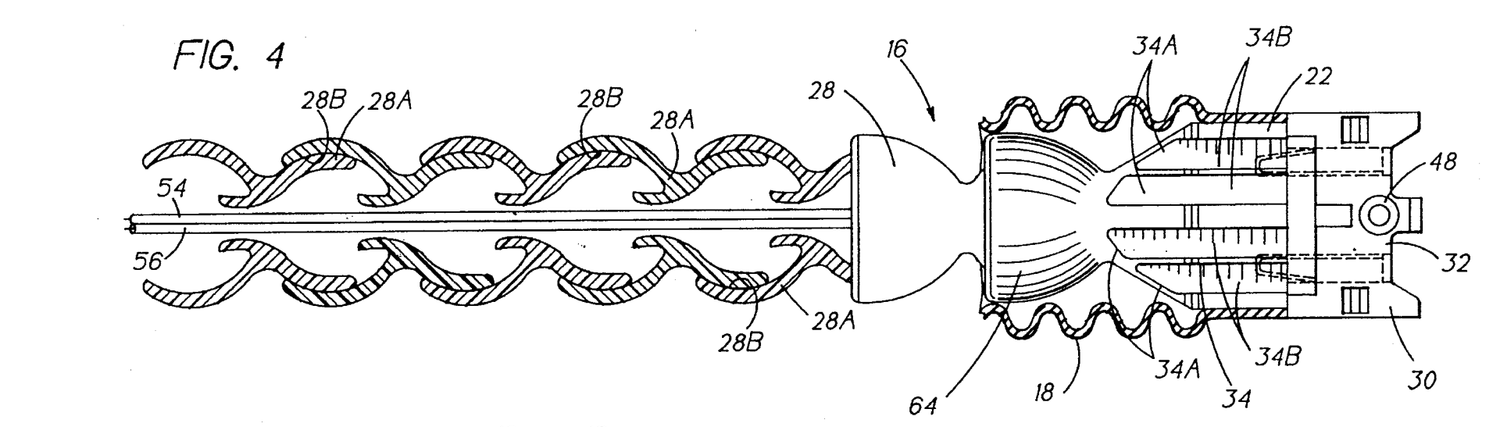
FIG. 4 is an enlarged elevational view illustrating details of a portion of the flashlight of the present invention.
Figure 5:
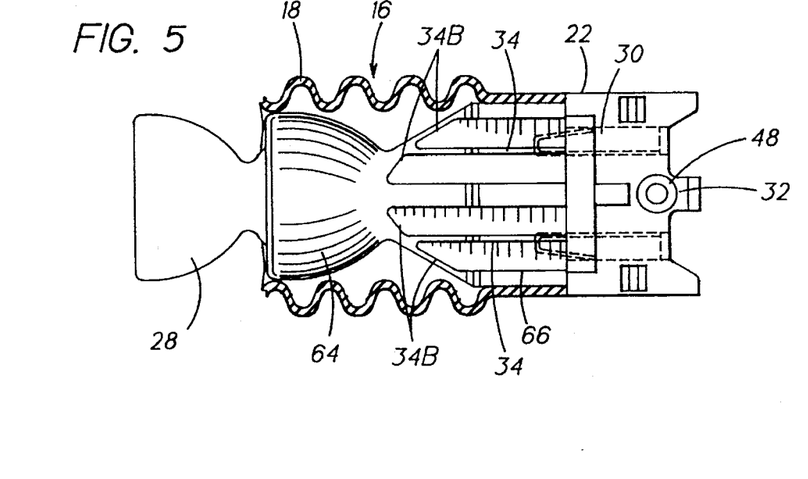
FIG. 5 is an enlarged elevational view of a further portion of the flashlight of the invention.

Sleeve 18 provides a protective cover over spine 28. The sleeve maintains an attractive appearance of the flashlight even when the individual members of spine 28 are skewed relative to each other.

An anchor 22 is connected to each end of flexible core 16. One of the anchors is inserted into bore 13 of housing 12 and the other of the anchors is inserted into bore 15 of housing 14. Anchor 22 includes a ball portion 64, a main body portion 66 which includes a plurality of upstanding ribs 34 and a somewhat rectangularly shaped portion 30. The height of center rib 34A is somewhat greater when compared to the height of the other ribs 34 of each anchor 22. As will be more fully described hereinafter, portion 30 has an open end facing away from body portion 66 for receiving strain relief 32 therewithin. Each rib 34 includes a ramp-like leading surface 34B for expanding the material of sleeve 18 outwardly to enable each end of the sleeve to be emplaced about an anchor.

Strain relief 32 includes a pair of longitudinally spaced slots 47. Strain relief 32 mounted within housing 14 receives contacts 36, 38 in slots 47 while strain relief 32 mounted in housing 12 receives contacts 42, 46 in slots 47. The strain relief electrically connects conductors 54,56 to the contacts in each housing 12, 14. Contact 42 in housing 12 is, in turn, connected to negative strip conductor 45 while contact 42 is connected to positive conductor 44. (See FIG. 3) Conductors 44 and 45 are, in turn, connected to batteries 78 and 80. Housing 12 includes a removable battery cap 40. Contacts 36, 38 are connected to conductors 58, 60 in housing 14.

As shown, switch 20 is in series with conductor 58. As is known to those skilled in the art, switch 20 is normally open and is closed to connect bulb 92 to batteries 78, 80 via the various electrical conductors and contacts noted previously.

Figure 6:
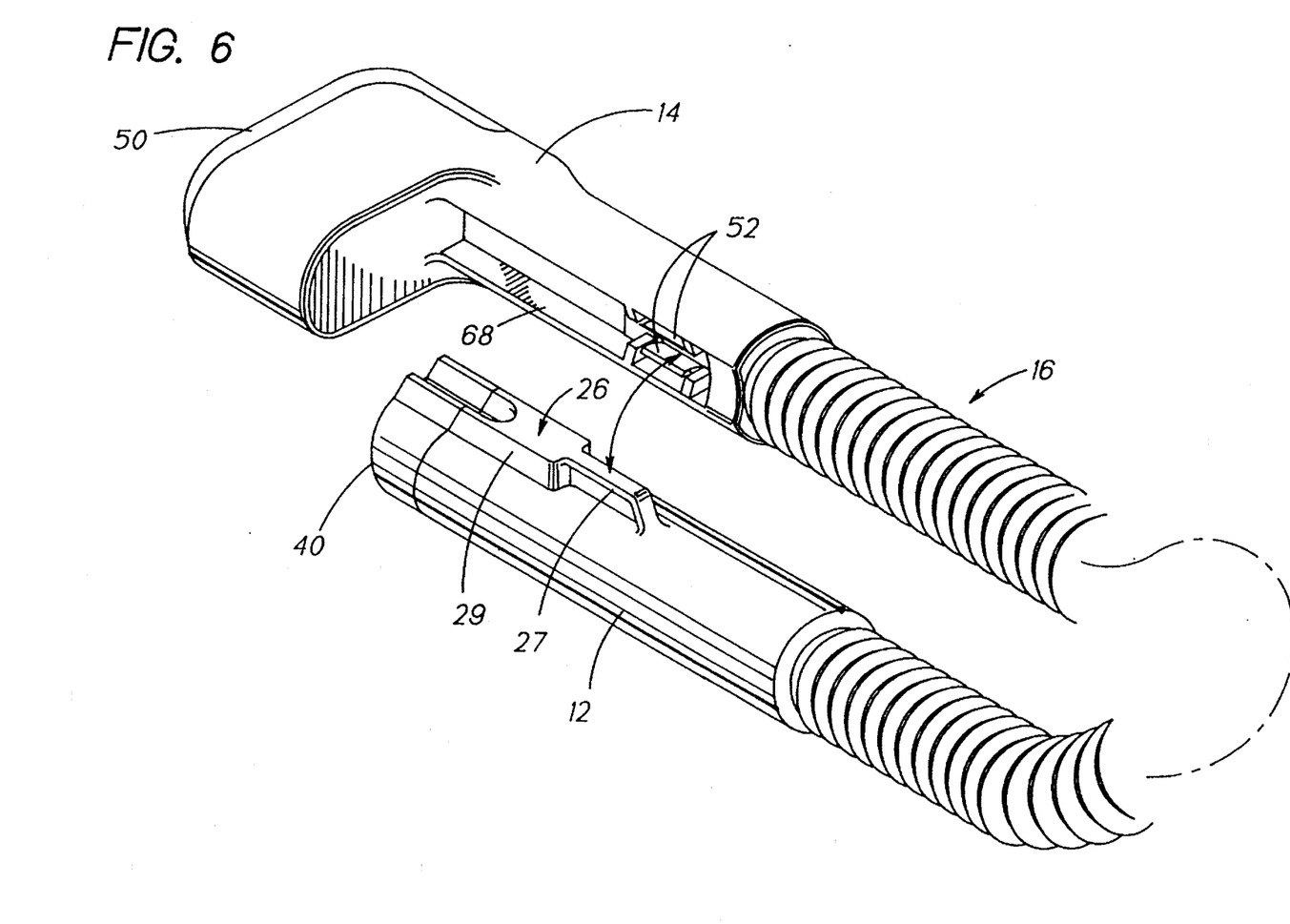
FIG. 6 is a perspective view of the flashlight in a somewhat folded position illustrating the manner in which the two housings of the flashlight may be joined together.
Figures 7, 8:
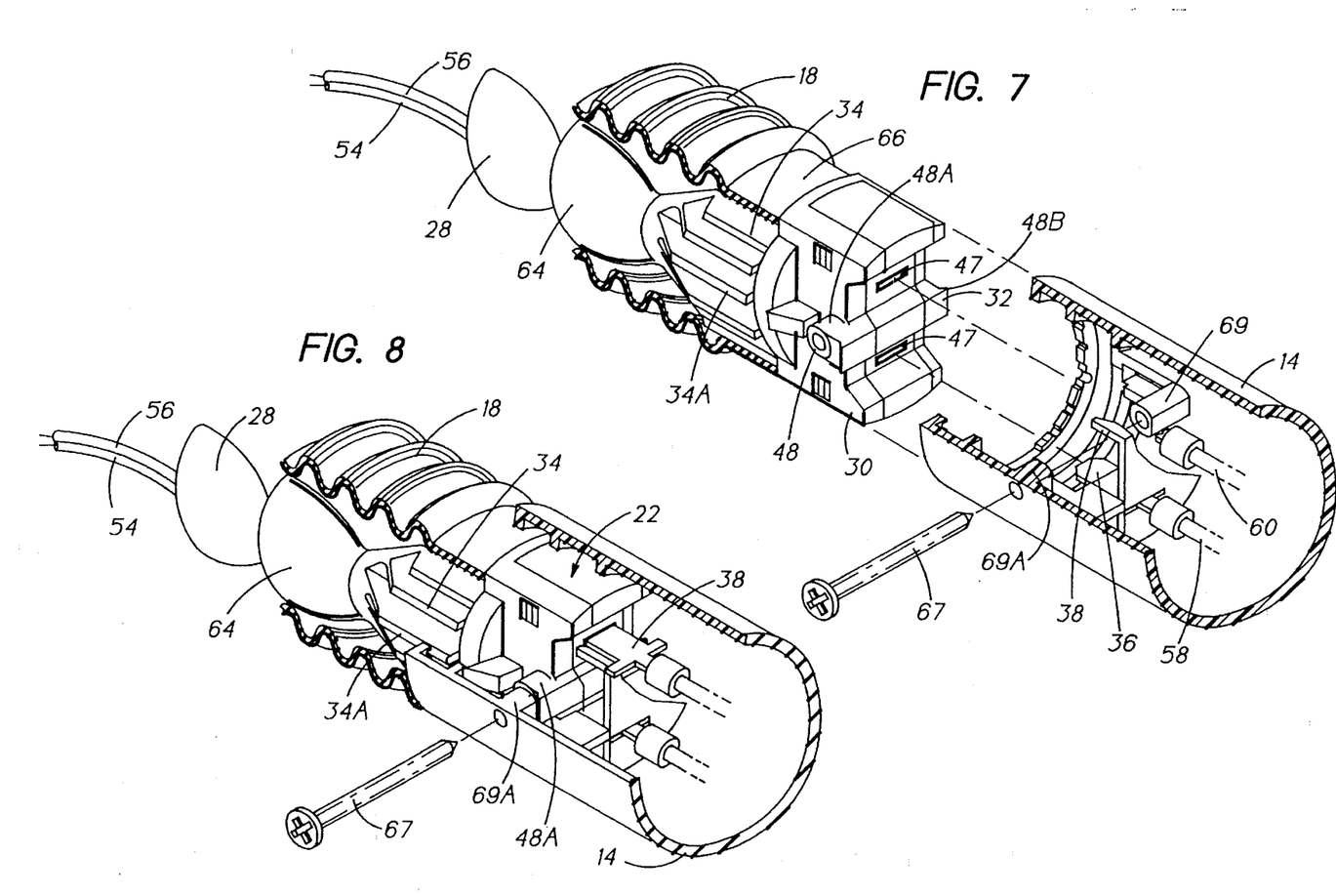
FIG. 7 is a perspective exploded view of a portion of the flashlight.
FIG. 8 is a view similar to FIG. 7 showing the parts in their assembled state.
Figures 9, 10:
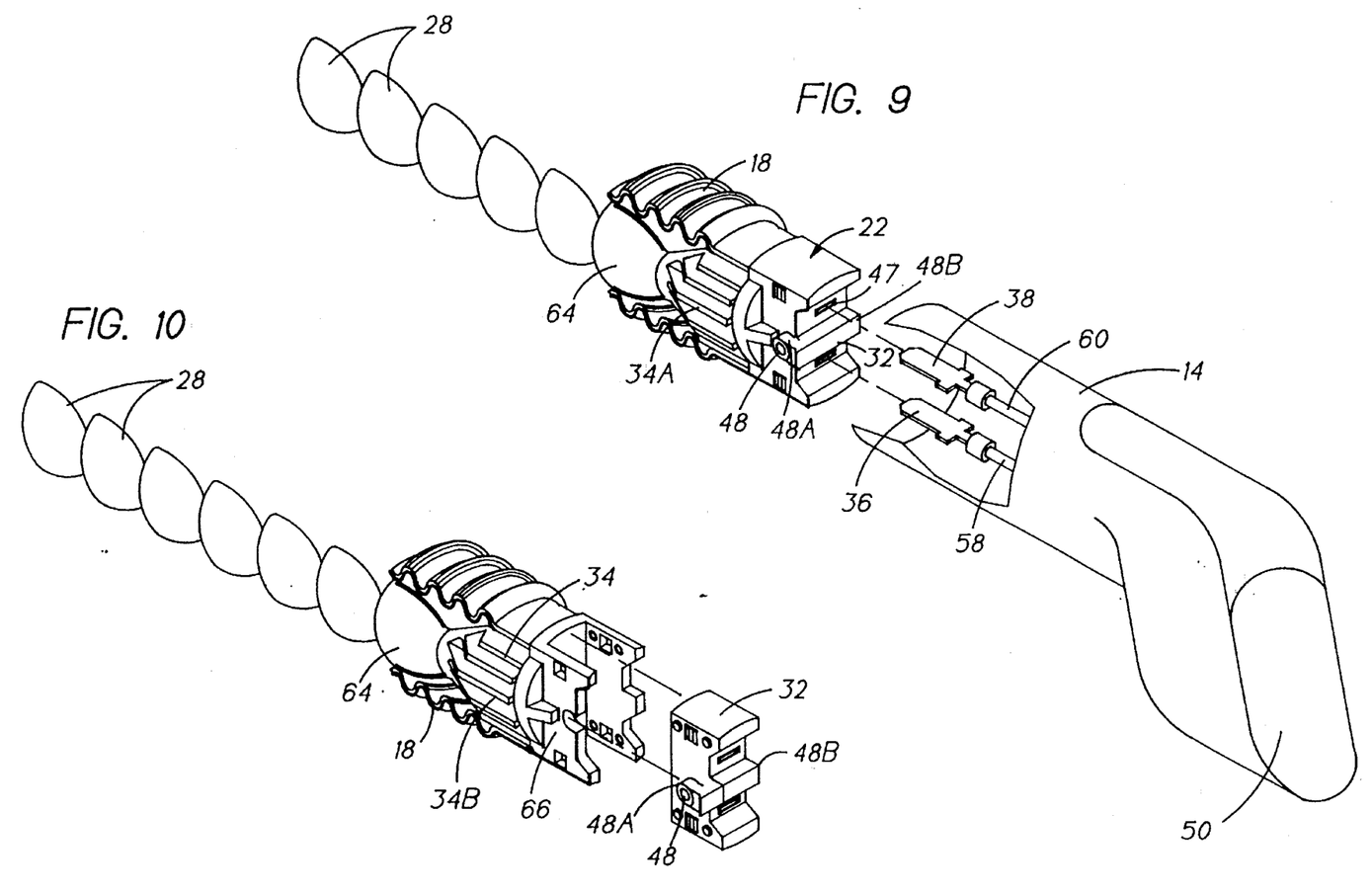
FIG. 9 is an exploded perspective view of a further portion of the flashlight.
FIG. 10 is an exploded perspective view of a subassembly of the flashlight.
Figure 11:
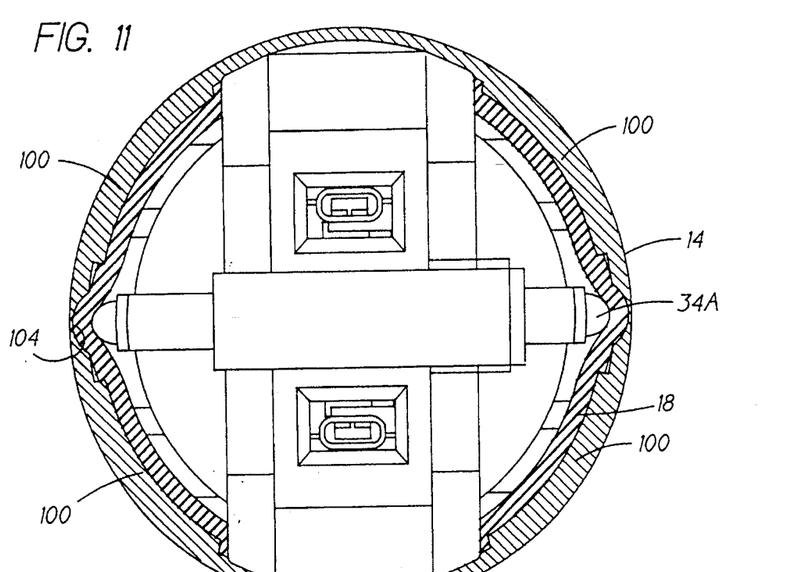
FIG. 11 is an enlarged sectional view taken along line 11—11 of FIG. 12.

Referring specifically to FIGS. 1 and 6, one of the housings, for example housing 12 includes an upstanding rib 26. Rib 26 includes a relatively thin elongated portion 27 connected to a relatively wide elongated portion 29. The other of the housings, for example housing 14 includes a groove 68 whose length is generally coextensive with the length of upstanding rib 26. Groove 68 is generally U-shaped and includes a pair of spring clips 52. Spring clips 52 are placed within groove 68 in a portion which overlies relatively narrow portion 27 of rib 26. If it is desired to reduce the overall length of flashlight 10, for example, for storage purposes, or for holding the flashlight for use in a conventional hand-held manner, core 16 is folded so that the core forms a generally U-shape so that housing 12 lies in the same vertical plane as housing 14. As shown specifically in FIG. 6, when core 16 is folded as described, rib 26 underlies U-shaped groove 68. To join the two housings together, rib 26 is snapped into groove 68. Relatively narrow portion 27 of rib 26 is inserted between the opposed faces of spring clips 52 which forces the opposed faces outwardly. When the rib is inserted into the groove, the opposed faces of the spring clip are forced inwardly to lock the rib within groove 68 to positively join the two housings together.

As described previously, each end of flexible core 16 includes an anchor 22. One of the anchors is inserted into bore 13 and the other of the anchors is inserted into bore 15. During testing, it has been found that twisting or turning the flexible core to obtain a desired configuration for the flashlight produces forces which tend to pull the sleeve from either or both bores of the housings or twist either end of sleeve 18 relative to bores 13 or 15. To prevent the undesired occurrence of the separation of sleeve 18 from one or both housings and the undesired twisting of sleeve 18 relative to the housings, grasping means, to be more fully described hereinafter, have been added to both bores 13, 15 and anchors 22.

Referring specifically to FIGS. 11–14, each bore 13, 15 is provided with a plurality of circumferentially spaced inwardly extending ridges respectively 100 and 102. Ridges 100 and 102 extend radially inwardly towards the surface of sleeve 18. In addition, each bore includes a pair of 180 degree circumferentially spaced grooves 104 which underly ribs 34A when each anchor 22 is placed in a respective bore 13, 15.

Figures 12, 13, 14:
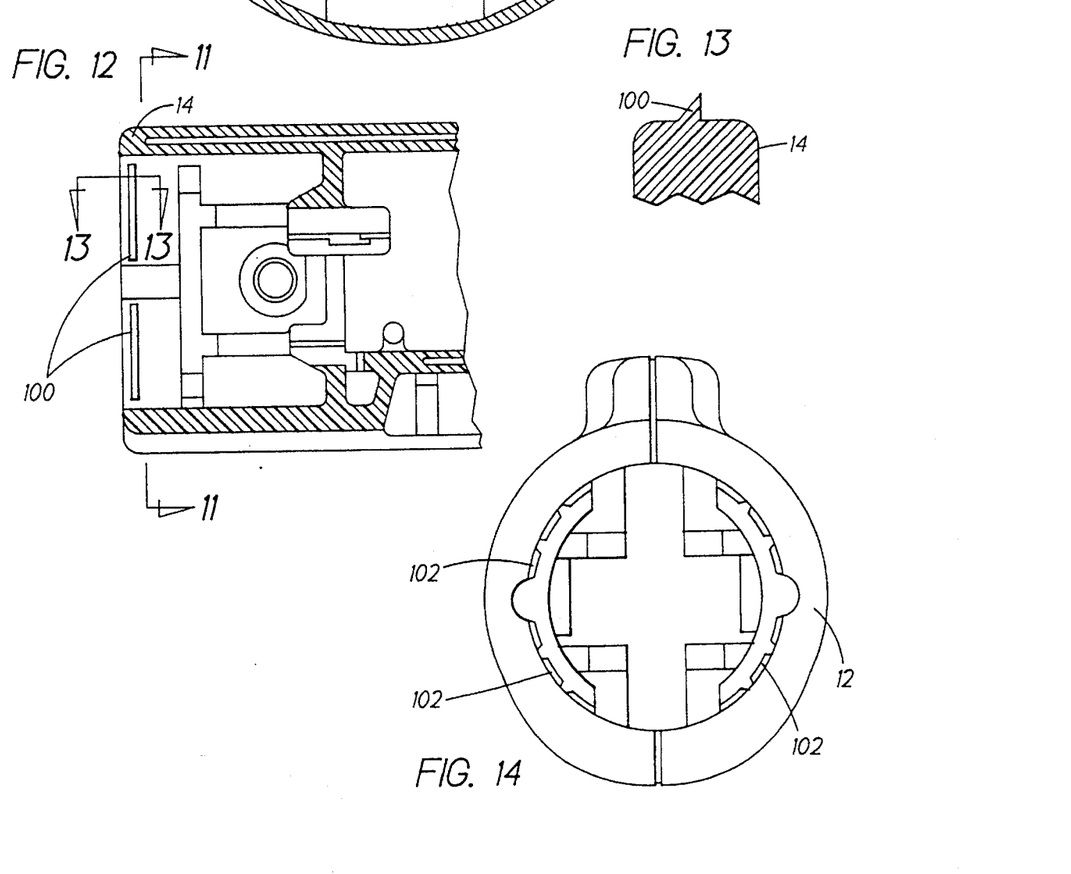
FIG. 12 is a fragmentary sectional view of a portion of one of the housings of the flashlight illustrating details thereof.
FIG. 13 is an enlarged sectional view taken along line 13—13 of FIG. 12.
FIG. 14 is an end view taken along line 14—14 of FIG. 1.

Housing 14 includes four circumferentially spaced ridges 100 whereas housing 12 includes 12 circumferentially spaced ridges 102. The length of each ridge 100 is greater than the length of each ridge 102. As shown in FIG. 13, the cross-sectional shape of each ridge 100 (or 102) is similar to a shark's tooth so that the outer surface of the sleeve engaged by each ridge 100, 102 is firmly grasped to sandwich the sleeve between the outer surface of anchor 22 and the outer surface of each ridge. This arrangement prevents the sleeve from being twisted relative to each bore 13, 15 and prevents the sleeve from being separated from one or the other of housings 12, 14.

To further prevent any undesired twisting or longitudinal movement of the sleeve, ribs 34A act to force the resilient material of sleeve 18 into the underlying grooves 104. The combination of ribs 34A and grooves 104 further prevent twisting of sleeve 18.

A further feature of the flashlight relates to strain relief 32. Strain relief 32 includes a hub portion 48 having a relatively enlarged boss 48A formed at one end of the hub. The other end of the hub does not have an enlarged boss similar to boss 48A and the end of the hub lies in the same vertical plane relative to the vertical plane of the end face of body portion 30 of anchor 22.

Each housing 12, 14, includes a relatively large inwardly extending boss 69 and a second circumferentially spaced relatively smaller boss 69A. When each anchor 22 and its associated strain relief 32 is inserted into one of the bores 13, 15, enlarged boss 48A of strain relief 32 is aligned with relatively smaller boss 69A of the housing and the flat surface 48B of the hub is aligned with relatively large boss 69 of the housing. In effect, the strain relief can only be inserted within the bore in one position due to the relationships established by bosses 48A, 69A and 69B and the flat surface 48B of hub 48. The foregoing enables anchor 22 and strain relief 32 to be used with a polarized plug. A screw 67 or similar means is inserted through boss 69, hub 48 and boss 69A to affix each anchor 22 to its respective housing.

Figure 15:
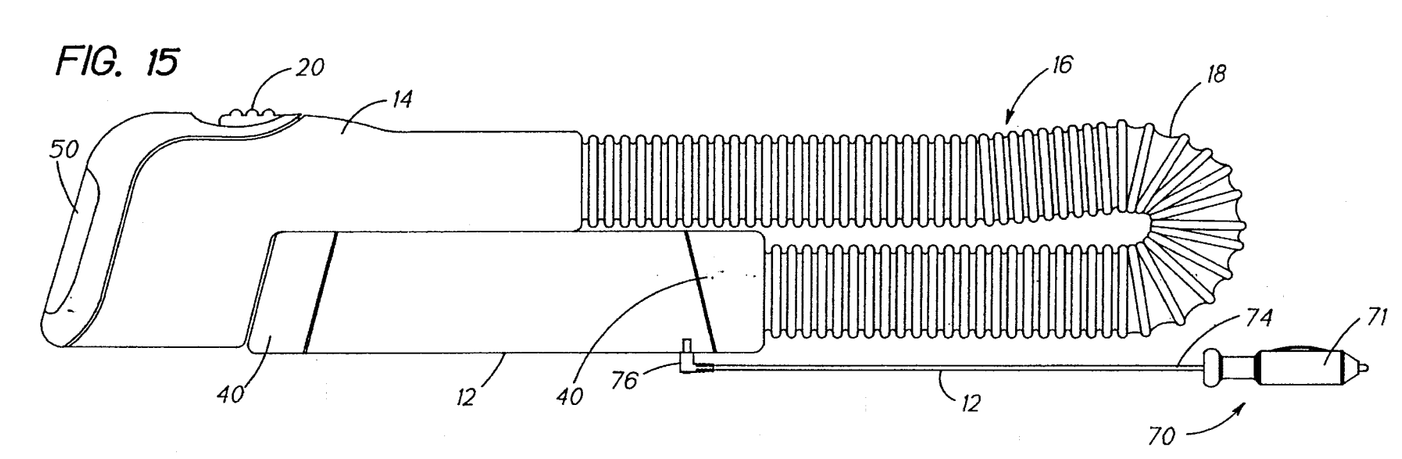
FIG. 15 is a schematic wiring diagram illustrating the flashlight powered by a 12 volt car battery.
Figure 16:
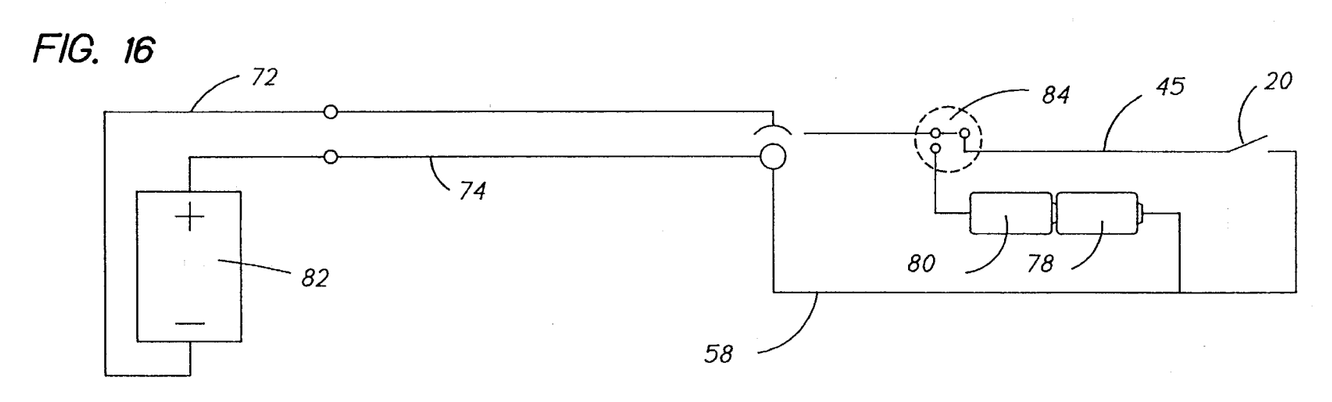
FIG. 16 is an elevational view showing the adaptor used to connect the flashlight to the 12 volt car battery.

Referring now to FIGS. 15 and 16, flashlight 10 will be shown as connected to an external source of power as for example a 12 volt car battery. When connected to an external source of electrical power, batteries 78 and 80 will be disabled.

There are many uses for flashlight 10 within or about an automobile. Accordingly, to conserve the energy of the batteries mounted within housing 12, it is desirable to connect flashlight 10 to car battery 82. Flashlight 10 is designed to be powered by a relatively few standard cells, such as a C cell. Specifically, in the preferred embodiment two C cells are used to provide an average DC voltage of 2.4 volts. Since the voltage of the car battery (typically 12 volts) is much greater than that required to power flashlight 10, the voltage must be reduced to approximately 2.4 volts without excessive heat generation which is usable by a flashlight bulb 92. Voltage conversion may be accomplished with a DC convertor or pulse width modulation circuit or by the use of passive means, such as a dropping resistor. Each of the foregoing means have problems associated therewith particularly when it is desired to use such means with a flashlight.

An adaptor 70 is provided for connection to the 12 volt battery and to the flashlight. Adaptor 70 includes a plug 71 for insertion into the 12 volt battery terminal provided within the automobile's passenger compartment. Adaptor 70 includes conductors 72 and 74. One of the conductors, for example, conductor 74 is formed from nickel chromium wire for reasons to be more fully described hereinafter. Conductors 72 and 74 terminate in a second plug 76 which is insertable into an opening provided in housing 12 of flashlight 10. When inserted into housing 12, plug 76 actuates disconnect switch 84 so that batteries 78 and 80 are disconnected from the flashlight's electrical circuitry. When plug 76 is removed from housing 12, switch 84 closes to reconnect the batteries to the flashlight's circuit. When switch 20 of flashlight 10 is closed, battery 82 provides electrical power through conductors 72, 74 of adaptor 70, conductors 45 and 58 representative of the conductors within the flashlight, to flashlight bulb 92.

The resistance of nickel chromium wire 74 is relatively high and therefore conductor 74 functions as a dropping resistor to reduce the voltage level delivered from the 12 volt source of DC voltage to the 2.4 voltage level required to power the flashlight bulb. The total length of conductor 74 is 12 feet and its resistance rating is 0.74 ohms per foot. By forming one of the conductors of adaptor 70 from a nickel chromium wire, the applied voltage is reduced to its desired level without significantly increasing the cost of the flashlight nor generating a significant level of undesired heat. In the preferred embodiment nickel chromium wire 74 is manufactured by Hoskins Manufacturing Company and sold under the trademark "Chromel A."

While a preferred embodiment of the present invention has been described and illustrated, the invention should not be limited thereto but may be otherwise embodied within the scope of the following claims.

What is claimed is:

1. A flashlight having a total length formed by a base housing, a working end housing and a flexible core assembly comprising:

said base housing forming a power end for said flashlight and having a longitudinally extending bore capable of housing at least one battery, said base housing further characterized by having a longitudinal dimension that is between about 15% and about 30% of the total length of said flashlight, and a shortest transverse dimension normal to a longitudinal axis that is between about 3% and 10% of the total length of said flashlight;

said working end housing spaced from said base housing and supporting in operative relationship a reflector, a lens, and a light bulb, said working end housing further characterized by having a longitudinal dimension that is between about 10% and about 25% of the total length of the flashlight, a width at a broadest part between about 8% and about 13% of the total length of said flashlight and a thickness between about 5% and about 12% of the total length of said flashlight;

said flexible core assembly connecting said base housing in operative relationship with said working end housing, flexible core assembly further characterized by having a longitudinal dimension between about 50% and about 65% of the total length of said flashlight;

said flexible core assembly further comprising an outer resilient sleeve surrounding an inner flexible spine;

electrical conductors housed within said flexible core assembly to electrically connect said base housing with said working end housing; and an electrical on/off switch operably connected to said electrical conductors to control the flow of electricity from said base housing to said working end housing.

2. The flashlight of claim 1, wherein said base housing acts as a counterweight enabling said flashlight to be formed into a variety of positions to direct said bulb and said reflector as desired by the user.

3. The flashlight of claim 1, further characterized in that the flexible core assembly can be folded to place said base housing adjacent said working end housing, resulting in a folded length that is between about 45% and about 60% of the extended length of the flashlight.

4. The flashlight of claim 1 wherein said lens is removable from said working end housing permitting access to said bulb.

5. The flashlight of claim 1 wherein said inner spine comprises a plurality of interconnected universally rotatable members.

6. The flashlight of claim 5 wherein said interconnected universally rotatable members are ball and socket joints.

7. The flashlight of claim 1 further comprises at least one slot and one circumferentially-oriented ridge inside said base housing to secure said resilient outer sleeve to substantially prevent said sleeve from moving longitudinally with respect to said base housing.

8. The flashlight of claim 1 further comprises at least one slot and one circumferential ridge inside said working end housing to secure said resilient outer sleeve to substantially prevent said sleeve from moving longitudinally with respect to said working end housing.

9. The flashlight of claim 1 wherein said outer resilient sleeve has a plurality of circumferential ridges along the length of an outer surface thereof.

10. The flashlight of claim 1 further comprises first means for preventing the rotation of said resilient outer sleeve relative to said base housing and second means for preventing the rotation of said resilient outer sleeve relative to said working end housing.

11. The flashlight of claim 1 further comprises a first means pin oriented transversely to said flexible core assembly and securing said inner flexible spine to said base housing and a second pin oriented transversely to said flexible core assembly and securing said spine to said working end housing.

12. The flashlight of claim 11 further comprises at least one inwardly extending boss inside said working end housing to receive said second pin.

13. The flashlight of claim 11 further comprises strain relief termination members at both ends of said inner spine, wherein said first and second pins fully transpierce said strain relief termination members to pivotably attach said termination members to said base housing and said working end housing respectively.

14. The flashlight of claim 1 wherein said electrical on/off switch is located on an exterior surface of said working end housing.

15. The flashlight of claim 1 wherein said base housing is elongated and holds two batteries end to end.

16. The flashlight of claim 1 further comprising a battery cap member assembly attached to said base housing to allow the replacement of batteries.

17. The flashlight of claim 1 further comprising a strain relief termination member operatably attached between said inner spine and said working end housing.

18. A flashlight having a total length formed by a base, a working end housing and a flexible core assembly comprising:

said base which acts as a counterweight, forms a power end for said flashlight and has a longitudinally extending bore capable of housing at least one battery, said base housing further characterized by having a longitudinal dimension that is between about 15% and about 30% of the total length of said flashlight, and a shortest transverse dimension normal to a longitudinal axis that is between about 3% and 10% of the total length of said flashlight;

said working end housing separated from said base housing and supporting in operative relationship a reflector, a lens, and a light bulb, said working end housing further characterized by having a longitudinal dimension that is between about 10% and about 25% of the total length of the flashlight, a width at its broadest part between about 5% and about 13% of the total length of said flashlight and a thickness between about 5% and about 12% of the total length of said flashlight;

said flexible core assembly connecting said base housing in operative relationship with said working end housing, said flexible core assembly further characterized by having a longitudinal dimension between about 50% and about 65% of the total length of said flashlight;

said flexible core assembly further comprising an outer resilient sleeve surrounding a plurality of interconnected rotatable ball and socket joints forming an inner flexible core and capable of being folded to place said base housing adjacent said working end housing, resulting in a folded length that is between about 45% and about 60% of the extended length of the flashlight;

at least one circumferential ridge and slot arrangement inside said working housing to secure said resilient outer sleeve to substantially prevent said sleeve from moving longitudinally with respect to said working end housing;

said outer resilient sleeve having a plurality of circumferential ridges along the length of an outer surface thereof and first means for preventing the rotation of said resilient outer sleeve relative to said base housing and second menas for preventing the rotation of said resilient outer sleeve relative to said working end housing;

electrical conductors housed within said flexible core assembly to electrically connect said base housing with said working end housing; and an electrical on/off switch operably connected to said electrical conductors to control the flow of electricity from said base housing to said working end housing.

19. The flashlight of claim 18, further comprising a first pin oriented transversely to said flexible core assembly and securing said inner flexible core to said base housing and a second pin oriented transversely to said flexible core assembly and securing said inner flexible core to said working end housing.

20. The flashlight of claim 19 wherein an adaptor having one nickel-chromium wire selectively connects said pair of conductive wires to an external source of power and disconnects said wire from said battery housing in said base.

21. The flashlight of claim 18 wherein an adaptor having one nickel-chromium wire selectively connects said pair of conductive wires to an external source of power and disconnects said wire from said battery housing in said base.

* * * * *